United States Patent
Liu et al.

(10) Patent No.: US 12,126,802 B2
(45) Date of Patent: Oct. 22, 2024

(54) PARTITIONS ON SUB-BLOCK TRANSFORM MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Weijia Zhu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 226 days.

(21) Appl. No.: 17/473,440

(22) Filed: Sep. 13, 2021

(65) Prior Publication Data
US 2022/0007057 A1 Jan. 6, 2022

Related U.S. Application Data

(63) Continuation of application No. PCT/CN2020/079235, filed on Mar. 13, 2020.

(30) Foreign Application Priority Data

Mar. 13, 2019 (WO) ............... PCT/CN2019/077942
Apr. 12, 2019 (WO) ............... PCT/CN2019/082428

(51) Int. Cl.
*H04N 19/122* (2014.01)
*H04N 19/105* (2014.01)
(Continued)

(52) U.S. Cl.
CPC ......... *H04N 19/122* (2014.11); *H04N 19/105* (2014.11); *H04N 19/119* (2014.11);
(Continued)

(58) Field of Classification Search
CPC ...... H04N 19/157; H04N 19/14; H04N 19/13; H04N 19/119; H04N 19/105; H04N 19/122
See application file for complete search history.

(56) References Cited

U.S. PATENT DOCUMENTS 9,215,470 B2 12/2015 Karczewicz et al.
9,451,254 B2 9/2016 Joshi et al.
(Continued)

FOREIGN PATENT DOCUMENTS

CN 104272735 A 1/2015
CN 109328461 A 2/2019
(Continued)

OTHER PUBLICATIONS

Bross et al. ""Versatile Video Coding (Draft 4),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M1001, 2019.

(Continued)

*Primary Examiner* — On S Mung
(74) *Attorney, Agent, or Firm* — Conley Rose, P.C.

(57) ABSTRACT

A method for video processing includes applying a sub-block residual coding scheme to a current video block, wherein the residual of the current video block is split into a plurality of sub-blocks each having a size of M*N, determining at least one sub-block with non-zero coefficients based on characteristic associated with each of the (Continued)

plurality of sub-blocks; coding the residue of the current video block based on the derived at least one sub-block with non-zero coefficients.

22 Claims, 9 Drawing Sheets

(51) Int. Cl.
| | |
|---|---|
| *H04N 19/119* | (2014.01) |
| *H04N 19/13* | (2014.01) |
| *H04N 19/14* | (2014.01) |
| *H04N 19/157* | (2014.01) |
| *H04N 19/176* | (2014.01) |
| *H04N 19/60* | (2014.01) |
| *H04N 19/70* | (2014.01) |

(52) U.S. Cl.
CPC ............ *H04N 19/13* (2014.11); *H04N 19/14* (2014.11); *H04N 19/157* (2014.11); *H04N 19/176* (2014.11); *H04N 19/60* (2014.11); *H04N 19/70* (2014.11)

(56) References Cited

U.S. PATENT DOCUMENTS

| | | |
|---|---|---|
| 9,628,795 B2 | 4/2017 | Zhang et al. |
| 9,736,454 B2 | 8/2017 | Hannuksela et al. |
| 9,756,336 B2 | 9/2017 | Zhang et al. |
| 9,787,990 B2 | 10/2017 | Gokhale et al. |
| 9,819,965 B2 | 11/2017 | Puri et al. |
| 9,883,198 B2 | 1/2018 | Puri et al. |
| 9,906,813 B2 | 2/2018 | Zhang et al. |
| 10,165,252 B2 | 12/2018 | An et al. |
| 10,230,980 B2 | 3/2019 | Liu et al. |
| 10,257,539 B2 | 4/2019 | An et al. |
| 10,271,048 B2 | 4/2019 | Zhang et al. |
| 10,334,281 B2 | 6/2019 | Zhang et al. |
| 10,390,044 B2 | 8/2019 | Karczewicz et al. |
| 10,404,988 B2 | 9/2019 | Ye et al. |
| 10,491,922 B2 | 11/2019 | Zhao et al. |
| 10,587,859 B2 | 3/2020 | An et al. |
| 10,609,423 B2 | 3/2020 | Chuang et al. |
| 10,666,948 B2 | 5/2020 | Rosewarne et al. |
| 10,701,358 B2 | 6/2020 | Zhao et al. |
| 10,721,489 B2 | 7/2020 | Chen et al. |
| 10,728,557 B2 | 7/2020 | Sarwer et al. |
| 10,743,027 B2 | 8/2020 | Zheng et al. |
| 10,750,182 B2 | 8/2020 | Cheong et al. |
| 10,771,811 B2 | 9/2020 | Liu et al. |
| 10,798,382 B2 | 10/2020 | Zhao et al. |
| 10,798,419 B2 | 10/2020 | Cheong et al. |
| 10,812,806 B2 | 10/2020 | Zhang et al. |
| 10,904,580 B2 | 1/2021 | Huang et al. |
| 10,904,581 B2 | 1/2021 | Lee |
| 10,939,107 B2 | 3/2021 | Sarwer et al. |
| 11,032,542 B2 | 6/2021 | Bordes et al. |
| 11,044,471 B2 | 6/2021 | Lee et al. |
| 11,082,708 B2 | 8/2021 | Zhang et al. |
| 11,218,704 B2 | 1/2022 | Lim et al. |
| 11,509,907 B2 | 1/2022 | Jun et al. |
| 11,290,715 B2 | 3/2022 | Lim et al. |
| 11,323,705 B2 | 5/2022 | Lee et al. |
| 11,350,107 B2 | 5/2022 | Jun et al. |
| 11,368,722 B2 | 6/2022 | Lee et al. |
| 11,375,185 B2 | 6/2022 | Lee et al. |
| 11,375,191 B2 | 6/2022 | Thoreau et al. |
| 11,445,186 B2 | 9/2022 | Lee |
| 11,445,215 B2 | 9/2022 | Lee et al. |
| 11,563,954 B2 | 1/2023 | Jun et al. |
| 11,616,976 B2 | 3/2023 | Lim et al. |
| 11,677,940 B2 | 6/2023 | Lim et al. |
| 11,743,456 B2 | 8/2023 | Lee et al. |
| 11,805,256 B2 | 10/2023 | Lim et al. |
| 11,831,910 B2 | 11/2023 | Ko et al. |
| 2013/0343455 A1 | 12/2013 | Yamamoto |
| 2014/0301463 A1 | 10/2014 | Rusanovskyy et al. |
| 2016/0286232 A1 | 9/2016 | Li et al. |
| 2017/0280161 A1 | 9/2017 | Cai et al. |
| 2018/0014017 A1 | 1/2018 | Li et al. |
| 2018/0103252 A1 | 4/2018 | Hsieh et al. |
| 2018/0192072 A1 | 7/2018 | Chen et al. |
| 2018/0352226 A1 | 12/2018 | An et al. |
| 2019/0149821 A1* | 5/2019 | Moon ................ H04N 19/70 375/240.02 |
| 2019/0222865 A1 | 7/2019 | Zhang et al. |
| 2019/0306502 A1 | 10/2019 | Gadde et al. |
| 2019/0364278 A1 | 11/2019 | Lee |
| 2020/0045336 A1 | 2/2020 | Xiu et al. |
| 2020/0120336 A1 | 4/2020 | Racape et al. |
| 2020/0195920 A1 | 6/2020 | Racape et al. |
| 2020/0236362 A1 | 7/2020 | Lee et al. |
| 2020/0267418 A1 | 8/2020 | Chuang et al. |
| 2020/0336738 A1 | 10/2020 | Xiu et al. |
| 2020/0374543 A1 | 11/2020 | Liu et al. |
| 2021/0006790 A1 | 1/2021 | Zhang et al. |
| 2021/0006803 A1 | 1/2021 | Zhang et al. |
| 2021/0014488 A1 | 1/2021 | Ko et al. |
| 2021/0029356 A1 | 1/2021 | Zhang et al. |
| 2021/0029368 A1 | 1/2021 | Zhang et al. |
| 2021/0076050 A1 | 3/2021 | Zhang et al. |
| 2021/0092436 A1 | 3/2021 | Zhang et al. |
| 2021/0136364 A1 | 5/2021 | Ko et al. |
| 2022/0030240 A1 | 1/2022 | Liu et al. |

FOREIGN PATENT DOCUMENTS

| | | |
|---|---|---|
| DE | 60036288 T2 | 10/2007 |
| EP | 2574056 A2 | 3/2013 |
| EP | 2866443 A1 | 4/2015 |
| EP | 2652954 B1 | 3/2016 |
| JP | 2013187869 A | 9/2013 |
| WO | 2010131903 A2 | 11/2010 |
| WO | 2011071342 A2 | 6/2011 |
| WO | 2011074919 A2 | 6/2011 |
| WO | 2018026118 A1 | 2/2018 |
| WO | 2018045332 A1 | 3/2018 |
| WO | 2019027200 A1 | 2/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"Information Technology—High Efficiency Coding and Media Delivery in Heterogeneous Environments—Part 2: High Efficiency Video Coding" Apr. 20, 2018, ISO/DIS 23008, 4th Edition.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Tsukuba et al. ""EE2.7-related: On Secondary Transform When Primary Transform is Skipped,"" Joint Video Exploration Team (JVET)of ITU-T SG 16 WP 3 and ISO/IEC JTC 1/SC 29/WG 113rd Meeting: Geneva, CH, May 26-Jun. 1, 2016, document JVET-C0045, 2016.

Zhao et al. ""CE6: Sub-block transform for inter blocks (Test 6.4.1),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0140, 2019.

Zhao et al. ""CE6 related: Unification of Transform Skip Mode and MTS,"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0501, 2019.

JEM-7.0: https://jvet.hhi.fraunhofer.de/svn/svn_HMJEMSoftware/ tags/ HM-16.6-JEM-7.0.

(56) References Cited

OTHER PUBLICATIONS https://vcgit.hhi.fraunhofer.de/jvet/VVCSoftware_VTM/tags/VTM-4.0.
International Search Report and Written Opinion from PCT/CN2020/079235 dated Jun. 16, 2020 (10 pages).
International Search Report and Written Opinion from PCT/CN2020/079245 dated Jun. 16, 2020 (10 pages).
"High Efficiency Vide Coding," Series H: AudioVisual and Mulitmedia Systems, Infrastructure of Audiovisual Services—Coding of Moving Video, Recommendation ITU-T H.265, ITU-T Telecommunication Standardization Sector of ITU, Dec. 2016.
Non-Final Office Action from U.S. Appl. No. 17/473,366 dated Sep. 11, 2023.
Final Office Action from U.S. Appl. No. 17/473,366 dated Dec. 20, 2023.

* cited by examiner

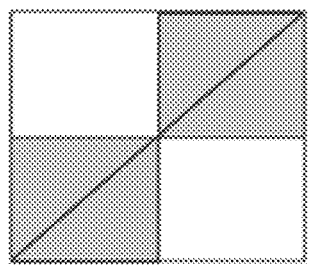
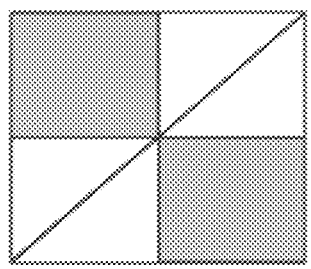
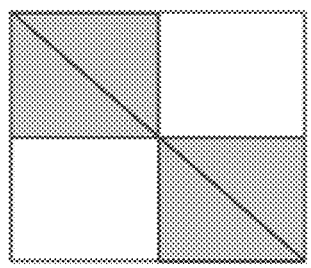
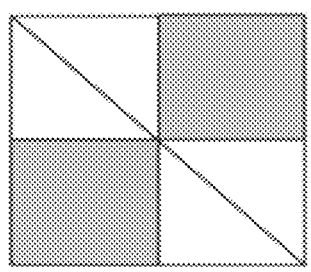
FIG. 6

PARTITIONS ON SUB-BLOCK TRANSFORM MODE

CROSS REFERENCE TO RELATED APPLICATIONS

This application is a continuation of International Patent Application No. PCT/CN2020/079235, filed on Mar. 13, 2020, which claims the priority to and benefit of International Patent Applications PCT/CN2019/077942, filed on Mar. 13, 2019, and PCT/CN2019/082428, filed on Apr. 12, 2019. All of the aforementioned patent applications are hereby incorporated by reference in their entireties.

TECHNICAL

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Various techniques for using sub-block based transforms during encoding and decoding of digital video are disclosed.

In one example aspect, there is disclosed a method for video processing, comprising: applying a sub-block residual coding scheme to a current video block, wherein the residual of the current video block is split into a plurality of sub-blocks each having a size of M*N, determining at least one sub-block with non-zero coefficients based on characteristic associated with each of the plurality of sub-blocks; coding the residue of the current video block based on the derived at least one sub-block with non-zero coefficients.

In another example aspect, there is disclosed a method for video processing, comprising: splitting residual of a current video block into N sub-blocks in a specific split pattern; and performing a conversion between the current video block and a bitstream representation of the current video block, wherein the N sub-blocks include K1 sub-blocks which employ a transform skip mode in which the residual are not transformed, K2 sub-blocks which employ a transform on the residual, and N-K1-K2 sub-blocks with zero coefficients, wherein N, K1 and K2 are integers, and K1>=0 and K2>=0.

In yet another example aspect, there is disclosed method for video processing, comprising: determining whether a transform skip mode is applicable to residual of a current video block in response to a transform skip flag, wherein the transform skip flag is determined implicitly without being signaled; and performing a conversion between the current video block and a bitstream representation of the current video block based on the determining.

In another example aspect, there is disclosed a method for video processing, comprising: transforming residual of a current video block coded in a sub-block transform mode by using a first transform matrix to generate one or multiple transformed sub-blocks, wherein the residual of the current video block is split into a plurality of sub-blocks and a sub-set of the sub-blocks have non-zero coefficients; transforming at least one region of at least one transformed sub-block having non-zero coefficient by using a second transform matrix, wherein the at least one region is located at a specific position of the at least one transformed sub-block and the second transform matrix is different from the first transform matrix; and performing a conversion between the current video block and a bitstream representation of the current video block based on the transforming.

In another example aspect, there is disclosed an apparatus in a video system comprising a processor and a non-transitory memory with instructions thereon, wherein the instructions upon execution by the processor, cause the processor to implement the method as described above.

In another example aspect, there is disclosed a non-transitory computer readable media, having program code stored thereupon, the program code, when executed, causing a processor to implement the method as described above.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 6 shows an example of a triangle partition used during conversion of a current video block.

DETAILED DESCRIPTION

Figure 1:
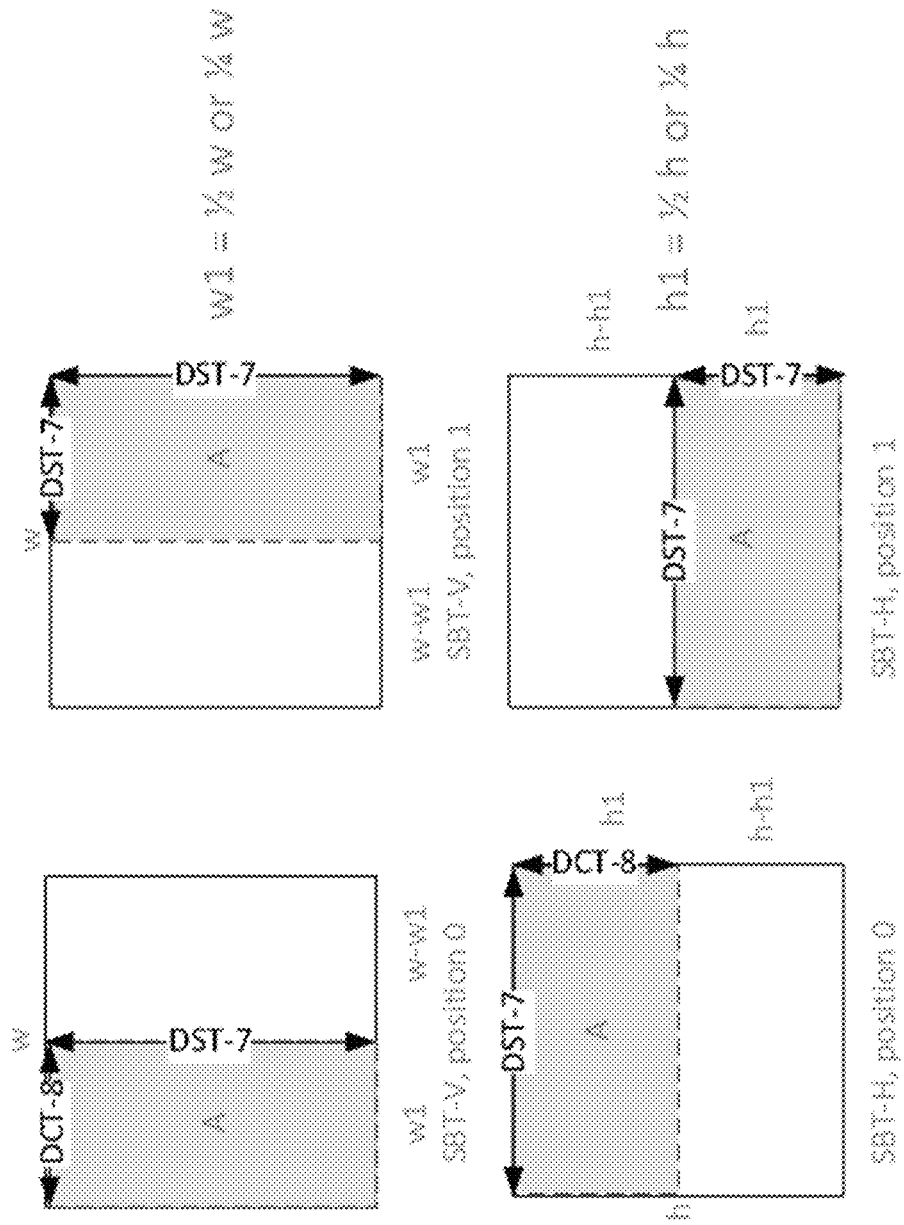
FIG. 1 shows an example illustration of sub-block transform (SBT) modes SBT-V and SBT-H.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. BRIEF SUMMARY

This invention is related to video coding technologies. Specifically, it is related to subblock transform in video coding, especially for screen content coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Multiple Transform Selection (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 2-1 shows the basis functions of the selected DST/DCT.

TABLE 2-1

Transform basis functions of DCT-II/VIII and DSTVII for N-point input

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-2. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-2

Transform and signalling mapping table

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

As in HEVC, the residual of a block can be coded with transform skip mode. To avoid the redundancy of syntax coding, the transform skip flag is not signalled when the CU level MTS_CU_flag is not equal to zero. Transform skip is enabled when both block width and height are equal to or less than 4.

2.2 Subblock Transform (SBT) in JVET-M0140

For an inter-predicted CU with cu_cbf equal to 1, cu_sbt flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

2.2.1 Sub-Block TU Tiling

When SBT is used for a inter CU, SBT type and SBT position information are further decoded from the bitstream. There are two SBT types and two SBT positions, as indicated in FIG. 1. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Figure 2:
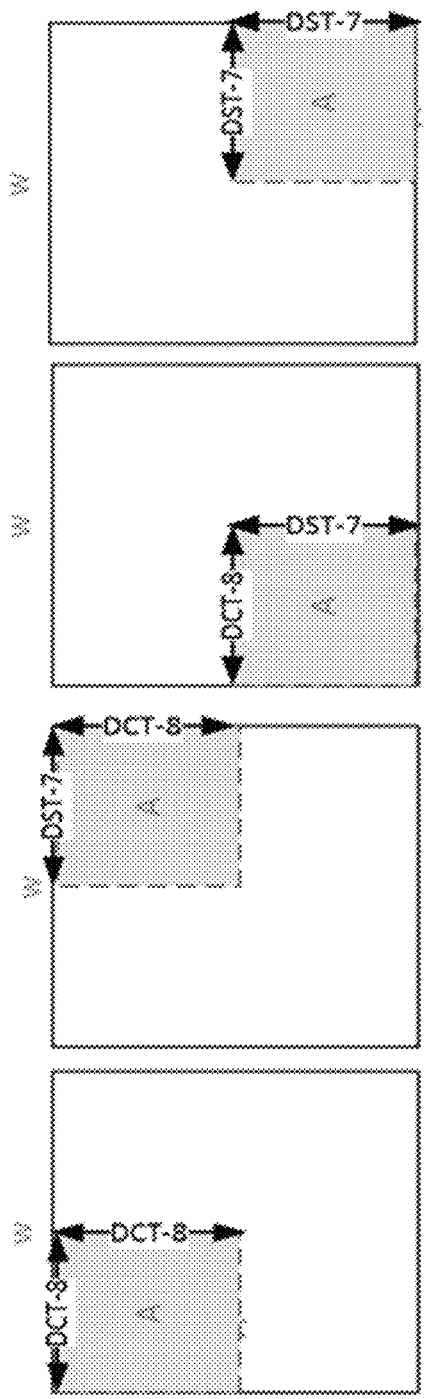
FIG. 2 shows an example Illustration of sub-block transform modes SBT-Q.

Quad-tree (QT) split is further used to tile one CU into 4 sub-blocks, and still one sub-block has residual, as shown in FIG. 2. This SBT type is denoted as SBT-Q.

SBT-V, SBT-H and SBT-Q are allowed for CU with width and height both no larger than maxSbtSize. The maxSbtSize is signaled in SPS. For HD and 4K sequences, maxSbtSize is set as 64 by encoder; for other smaller resolution sequences, maxSbtSize is set as 32.

2.2.2 Transform Type of the Sub-Block

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 1. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

FIG. 1 is an example illustration of sub-block transform modes SBT-V and SBT-H.

FIG. 2 is an example illustration of sub-block transform modes SBT-Q.

2.3 Subblock Transform in VVC

For an inter-predicted CU with cu_cbf equal to 1, i.e., with non-zero residual, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

When SBT is used for a inter CU, SBT type and SBT position information are further decoded from the bitstream. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 1. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

7.3.4.6 Coding Unit Syntax

| coding_unit( x0, y0, cbWidth, cbHeight, treeType ) { | Descriptor |
|---|---|
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE | | treeType = = DUAL_TREE_LUMA ) { | |
|         if( ( y0 % CtbSizeY ) > 0) | |
|           intra_luma_ref_idx[ x0 ][ y0] | ae(v) |
|         if (intra_luma_ref_idx[ x0 ][ y0] = = 0 && | |
|           ( cbWidth <= MaxTbSizeY | | cbHeight <= MaxTbSizeY ) && | |
|           ( cbWidth * cbHeight > MinTbSizeY * MinTbSizeY )) | |
|           intra_subpartitions_mode_flag[ x0 ][ y0] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |

-continued

| coding_unit( x0, y0, cbWidth, cbHeight, treeType) { | Descriptor |
|---|---|
|     else | |
|       intra_luma_mpm_remainder[ x0 ][ y0 ] | ae(v) |
|     } | |
|     if( treeType = = SINGLE_TREE \| \| treeType = = DUAL_TREE_CHROMA ) | |
|       intra_chroma_pred_mode[ x0 ][ y0 ] | ae(v) |
|   } | |
| } else if( treeType != DUAL_TREE_CHROMA ) { /* MODE_INTER */ | |
|   if( cu_skip_flag[ x0 ][ y0 ] = = 0) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else { | |
|     if( tile_group_type = = B) | |
|       inter_pred_idc[ x0 ][ y0] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0] | ae(v) |
|     } | |
|     if( inter_pred_idc[ x0 ][ y0 ] != PRED_L1 ) { | |
|       if( num_ref_idx_l0_active_minus1 > 0) | |
|         ref_idx_l0[ x0 ][ y0 ] ) | ae(v |
|       mvd_coding( x0, y0, 0, 0) | |
|       if( MotionModelIdc[ x0 ][ y0]> 0) | |
|         mvd_coding( x0, y0, 0, 1) | |
|       if(MotionModelIdc[ x0 ][ y0 ] > 1) | |
|         mvd_coding( x0, y0, 0, 2) | |
|       mvp_l0_flag[ x0 ][ y0] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( num_ref_idx_l1_active_minus1 > 0) | |
|         ref_idx_l1[ x0 ][ y0 ] | ae(v) |
|       if( mvd_l1_zero_flag && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         mvd_coding( x0, y0, 1, 0) | |
|       if( MotionModelIdc[ x0 ][ y0 ] > 0) | |
|         mvd_coding( x0, y0, 1, 1) | |
|       if(MotionModelIdc[ x0 ][ y0 ] > 1) | |
|         mvd_coding( x0, y0, 1, 2) | |
|       mvp_l1_flag[ x0 ][ y0 ] | ae(v) |
|     } else { | |
|       MvdL1[ x0 ][ y0 ][ 0 ] = 0 | |
|       MvdL1[ x0 ][ y0 ][ 1 ] = 0 | |
|     } | |
|     if( ( sps_amvr_enabled_flag && inter_affine_flag = = 0 && | |
|       ( MvdL0[ x0 ][ y0 ][ 0 ] != 0 \| \| MvdL0[ x0 ][ y0 ][ 1 ] != 0 \| \| | |
|         MvdL1[ x0 ][ y0 ][ 0 ] != 0 \| \| MvdL1[ x0 ][ y0 ][ 1 ] != 0 ) ) \| \| | |
|       ( sps_affine_amvr_enabled_flag && inter_affine_flag[ x0 ][ y0 ] = = 1 && | |
|         ( MvdCpL0[ x0 ][ y0 ][ 0 ][ 0 ] != 0 \| \| MvdCpL0[ x0 ][ y0 ][ 0 ][ 1 ] != 0 \| \| | |
|         MvdCpL1[ x0 ][ y0 ][ 0 ][ 0 ] != 0 \| \| MvdCpL1[ x0 ][ y0 ][ 0 ][ 1 ] != 0 \| \| | |
|         MvdCpL0[ x0 ][ y0 ][ 0 ][ 1 ] != 0 \| \| MvdCpL0[ x0 ][ y1 ][ 0 ][ 1 ] != 0 \| \| | |
|         MvdCpL1[ x0 ][ y0 ][ 0 ][ 1 ] != 0 \| \| MvdCpL1[ x0 ][ y1 ][ 0 ][ 1 ] != 0 \| \| | |
|         MvdCpL0[ x0 ][ y0 ][ 0 ][ 2 ] != 0 \| \| MvdCpL0[ x0 ][ y2 ][ 0 ][ 1 ] != 0 \| \| | |
|         MvdCpL1[ x0 ][ y0 ][ 0 ][ 2 ] != 0 \| \| MvdCpL1[ x0 ][ y2 ][ 0 ][ 1 ] != 0 ) ) | |
|       { | |
|       if( !sps_cpr_enabled_flag \| \| !( inter_pred_idc[ x0 ][ y0 ] = = PRED_L0 && | |
|         ref_idx_l0[ x0 ][ y0 ] = = num_ref_idx_l0_active_minus1 ) ) | |
|         amvr_flag[ x0 ][ y0 ] | ae(v) |
|       if( amvr_flag[ x0][ y0 ] ) | |
|         amvr_precision_flag[ x0 ][ y0 ] | ae(v) |
|     } | |
|     if( sps_gbi_enabled_flag && inter_pred_idc[ x0 ][ y0 ] = = PRED_BI && | |
|       cbWidth * cbHeight >= 256) | |
|       gbi_idx[ x0 ][ y0 ] | ae(v) |
|   } | |
| } | |

-continued

| coding_unit( x0, y0, cbWidth, cbHeight, treeType) { | Descriptor |
|---|---|
|   if( !pcm_flag[ x0 ][ y0 ] ) { | |
|     if( CuPredMode[ x0 ][ y0 ] != MODE_INTRA && merge_flag[ x0 ][ y0 ] = = 0) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH) && ( allowSbtVerQ \|\| allowSbtHorQ ) ) | |
|             cu_sbt_quad_flag | ae(v) |
|           if( ( cu_sbt_quad_flag && allowSbtVerQ && allowSbtHorQ ) \|\| | |
|             ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |
|       transform_tree( x0, y0, cbWidth, cbHeight, treeType ) | |
|     } | |
|   } | |
| } | |

7.3.4.10 Transform Tree Syntax

| transform_tree( x0, y0, tbWidth, tbHeight, treeType) { | Descriptor |
|---|---|
|   InferTuCbfLuma = 1 | |
|   if( IntraSubPartSplitType = = NO_ISP_SPLIT ) { | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform_tree( x0, y0, trafoWidth, trafoHeight) | |
|       if( tbWidth > MaxTbSizeY ) | |
|         transform_tree( x0 + trafoWidth, y0, trafoWidth, trafoHeight, treeType ) | |
|       if( tbHeight > MaxTbSizeY ) | |
|         transform_tree( x0, y0 + trafoHeight, trafoWidth, trafoHeight, treeType) | |
|       if( tbWidth > MaxTbSizeY && tbHeight > MaxTbSizeY ) | |
|         transform_tree( x0 + trafoWidth, y0 + trafoHeight, trafoWidth, trafoHeight, treeType) | |
|     } else { | |
|       transform_unit( x0, y0, tbWidth, tbHeight, treeType, 0) | |
|     } | |
|   } else if( cu_sbt_flag ) { | |
|     if( !cu_sbt_horizontal_flag ) { | |
|       trafoWidth = tbWidth * SbtNumFourthsTb0 /4 | |
|       transform_unit( x0, y0, trafoWidth, tbHeight, treeType, 0) | |
|       transform_unit( x0 + trafoWidth, y0, tbWidth − trafoWidth, tbHeight, treeType, 1 ) | |
|     } else { | |
|       trafoHeight = tbHeight * SbtNumFourthsTb0 /4 | |
|       transform_unit( x0, y0, tbWidth, trafoHeight, treeType, 0 ) | |
|       transform_unit( x0, y0 + trafoHeight, tbWidth, tbHeight − trafoHeight, treeType, 1 ) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } | |
| } | |

7.3.4.11 Transform Unit Syntax

| transform_unit( x0, y0, tbWidth, tbHeight, treeType, subTuIndex ) { | Descriptor |
|---|---|
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
| ( subTuIndex = = 1 && !cu_sbt_pos_flag ) ) ) ) \|\| | |
|       ( IntraSubPartitionsSplitType != ISP_NO_SPLIT && | |
|       ( subTuIndex < NumIntraSubPartitions − 1 \|\| !InferTuCbfLuma ) ) ) | |
|       tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|         ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( IntraSubPartitionsSplitType != ISP_NO_SPLIT && | |
|     treeType = = SINGLE_TREE && subTuIndex = = NumIntraSubPartitions − 1 ) ) | |
|     xC = CbPosX[ x0 ][ y0 ] | |
|     yC = CbPosY[ x0 ][ y0 ] | |
|     wC = CbWidth[ x0 ][ y0 ] / 2 | |
|     hC = CbHeight[ x0 ][ y0 ] / 2 | |
|   } else | |
|     xC = x0 | |
|     yC = y0 | |
|     wC = tbWidth / SubWidthC | |
|     hC = tbHeight / SubHeightC | |
|   } | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|   } | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT ) && ( !cu_sbt_flag ) ) { | |
|     if( transform_skip_enabled_flag && tbWidth <= MaxTsSize && tbHeight <= MaxTsSize ) | |
|       transform_skip_flag[ x0 ][ y0 ] | ae(v) |
|     if( ( ( CuPredMode[ x0 ][ y0 ] = = MODE_INTER && sps_explicit_mts_inter_enabled_flag ) | |
|       \|\| ( CuPredMode[ x0 ][ y0 ] = = MODE_INTRA && sps_explicit_mts_intra_enabled_flag )) | |
|       && ( tbWidth <= 32 ) && ( tbHeight <= 32) && ( !transform_skip_flag[ x0 ][ y0 ] ) ) | |
|       tu_mts_idx[ x0 ][ y0 ] | ae(v) |
|   } | |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( xC, yC, Log2( wC ), Log2( hC ), 1 ) | |
|   if( tu_cbf_cr[ x0 ][ y0 ] ) | |
|     residual_coding( xC, yC, Log2( wC ), Log2( hC ), 2 ) | |
| } | |

3. EXAMPLE PROBLEMS SOLVED BY THE DISCLOSED SOLUTIONS

SBT have following problems:
1) In transform skip mode, SBT does not work.
2) In SBT, split direction, split position and which part of the CU has non-zero coefficients are signaled explicitly to the decoder, which may consume many bits.
3) SBT is disallowed on IBC mode or CIIP (combined intra-inter prediction) mode.

4. EXAMPLES OF TECHNIQUES AND EMBODIMENTS

To resolve above mentioned problems, several methods are described in this document. Suppose width and height of the block is W and H respectively.

Figure 3:
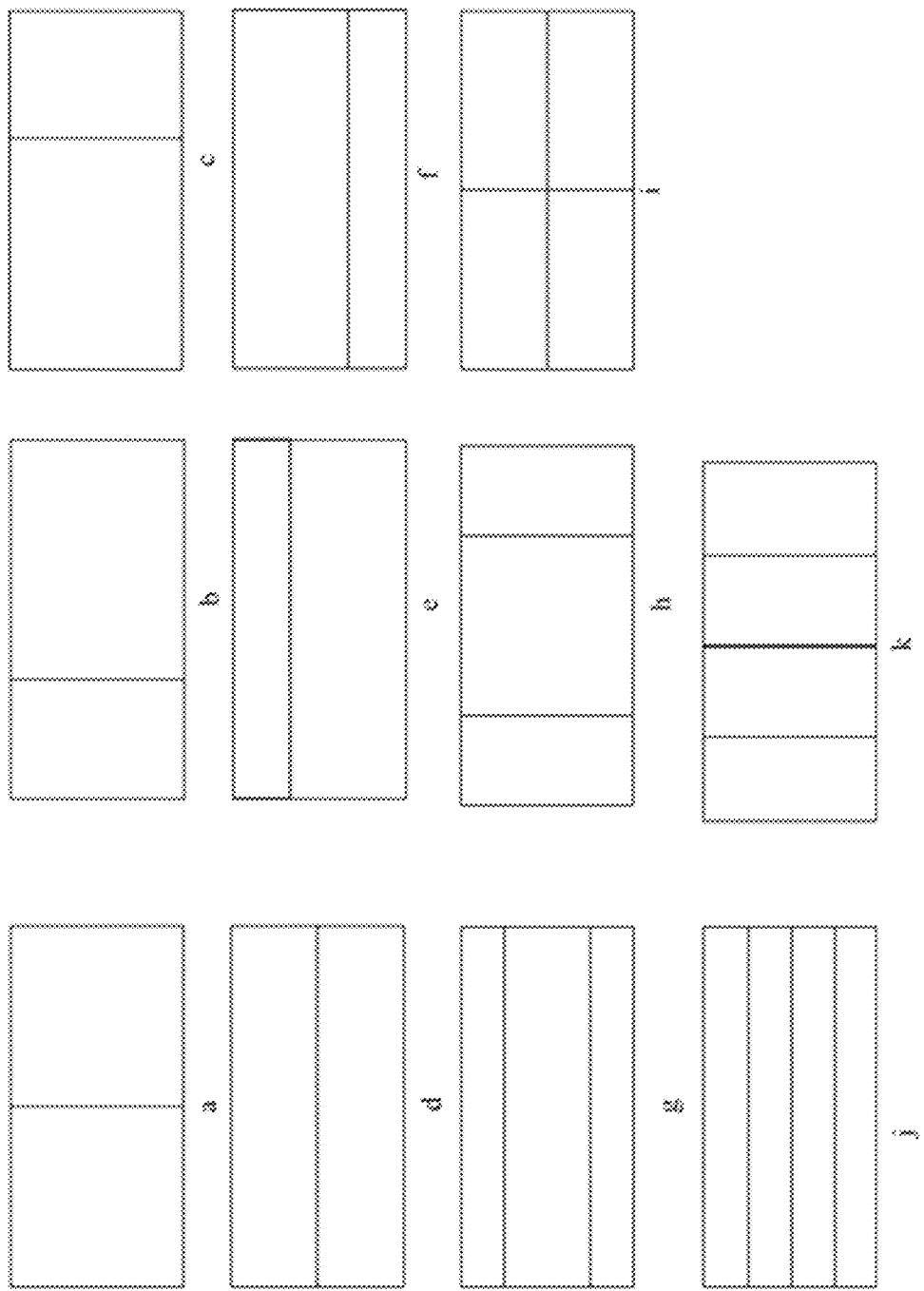
FIG. 3 shows examples of split patterns.

The detailed inventions below should be considered as examples to explain general concepts. These inventions should not be interpreted in a narrow way. Furthermore, these inventions can be combined in any manner.
1. Residual of a block coded in transform skip mode may be split into N (N>1) subblocks, and only K (0<=K<=N) of the N subblocks are with non-zero coefficients.
   a. In one example, the block may be split into 2 subblocks with size W/2*H or W*H/2, as shown in FIGS. 3a and d.
   b. In one example, the block may be split into 2 subblocks with size W/4*H or 3 W/4*H, as shown in FIGS. 3b and c.
   c. In one example, the block may be split into 2 subblocks with size W*H/4 or W*3H/4, as shown in FIGS. 3e and f.
   d. In one example, the block may be split into 3 subblocks with size W*H/4, W*2H/4 and W*H/4, as shown in FIG. 3h.
   e. In one example, the block may be split into 3 subblocks with size W/4*H, 2 W/4*H and W/4*H, as shown in FIG. 3g.
   f. In one example, the block may be split into 4 subblocks with size W/2*H/2, as shown in FIG. 3i.
   g. In one example, the block may be split into 4 subblocks with size W*H/4, as shown in FIG. 3j.
   h. In one example, the block may be split into 4 subblocks with size W/4*H, as shown in FIG. 3k.
   FIG. 3 shows examples of split patterns.
2. A flag may be signaled in VPS/SPS/PPS/tile group header/slice header/CU/block to indicate whether SBT in transform skip mode is employed or not.
   a. In one example, CU/block level SBT flag may be coded with CABAC engine.
      i. In one example, SBT flag of neighboring or/and non-adjacent blocks may be used to derive the context used in CABAC.
      ii. Alternatively, one fixed context may be used in CABAC coding of SBT flag.
3. Which split pattern is used may be signaled explicitly to the decoder.
   a. A first syntax element may be signaled to indicate whether the block is split into 2 subblock, 3 subblocks or 4 subblocks etc.
      i. 2 bits may be required for the first syntax element if the block can be split into 2 subblock, 3 subblocks or 4 subblocks.
      ii. Alternatively, if the block can only be split into 2 subblocks or 4 subblocks, only 1 bit is required.
      iii. Alternatively, if the block can only be split into 2 subblocks or 3 subblocks, only 1 bit is required.
      iv. Alternatively, if the block can only be split into 3 subblocks or 4 subblocks, only 1 bit is required.
      v. More bits may be required if the block can be split 2, 3, . . . , N subblocks.
   b. A second syntax element may be signaled to indicate whether the block is split vertically or horizontally.
      i. Such syntax element may be not required for some patterns, for example, if the block is split into 4 subblocks with size W/2*H/2.
   c. A third syntax element may be signaled to indicate the split position if the block is split into 2 subblocks.
      i. If the current block can only be split into two same size subblocks, the third syntax element is not required.
4. Which subblocks have non-zero coefficients in transform skip mode may be signaled explicitly or predefined for some split patterns.
   a. In one example, indices are explicitly signaled to indicate which subblocks have non-zero coefficients.
   b. In one example, indices are explicitly signaled to indicate which subblocks have zero coefficients.
   c. In one example, if the block is split into 2 subblocks with size W/4*H or 3 W/4*H, the index may be not signaled and only the W/4*H subblock may have non-zero coefficients.
      i. Alternatively, only the 3 W/4*H subblock may have non-zero coefficients.
   d. In one example, if the block is split into 2 subblocks with size W*H/4 or W*3H/4, the index may be not signaled and only the W*H/4 subblock may have non-zero coefficients.
      i. Alternatively, only the W*3H/4 subblock may have non-zero coefficients.
   e. In one example, if the block is split into 3 subblocks with size W/4*H, 2 W/4*H and W/4*H, the index may be not signaled and only the 2 W/4*H subblock may have non-zero coefficient.
   f. In one example, if the block is split into 3 subblocks with size W*H/4, W*2H/4 and W*H/4, the index may be not signaled and only the W*2H/4 subblock may have non-zero coefficient.
5. Which subblocks have non-zero coefficients may be derived implicitly for some or all split patterns for SBT or/and SBT in transform skip mode.
   a. In one example, spatial gradients are calculated for each subblock using its prediction samples, and the K (K>=1) subblocks with highest sum of absolute spatial gradient (SASG) may have non-zero coefficient.
   b. In one example, for bi-directional predicted blocks, temporal gradients are calculated for each subblock using its prediction samples in both directions, and the K subblocks with highest sum of absolute temporal gradient (SATG) may have non-zero coefficient.
   c. In one example, for bi-directional predicted blocks, both spatial and temporal gradients are calculated for each subblock, and the K subblocks with highest sum of absolute temporal and spatial gradient (SATSG) may have non-zero coefficient.
   d. SASG may be calculated using gradients of horizontal direction or/and vertical direction or/and 45-degree diagonal direction or/and 135-degree diagonal direction.

e. SASG or/and SATG or/and SATSG may be calculated only for some prediction samples.
   i. For example, SASG or/and SATG or/and SATSG may be calculated for the Mth (1<=M<=N) row of every N (N>=1) rows, e.g., M=1 and N=2.
6. Whether a split pattern in SBT or/and SBT in transform skip mode is valid for a block may depend on the block dimension or/and whether the block is at picture boundary or not.
   a. In one example, if W<T (e.g., T=16), the block may be not split into subblocks with size W/4*H and 3 W/4*H.
   b. In one example, if W<T (e.g., T=16), the block may be not split into two W/2*H subblocks.
   c. In one example, if W<T (e.g., T=16), the block may be not split into subblocks with size W/4*H, 2 W/4*H and W/4*H.
   d. In one example, if W<T (e.g., T=16), the block may be not split into four W/4*H subblocks.
   e. In one example, if H<T (e.g., T=16), the block may be not split into subblocks with size W*H/4 and W*3H/4.
   f. In one example, if H<T (e.g., T=16), the block may be not split into two W*H/2 subblocks.
   g. In one example, if H<T (e.g., T=16), the block may be not split into subblocks with size W*H/4, W*2H/4 and W*H/4.
   h. In one example, if H<T (e.g., T=16), the block may be not split into four W*H/4 subblocks.
   i. In one example, if W<T1 or/and H<T2 (e.g., T1=T2=16), the block may be not split into four W/2*H/2 subblocks.
   j. In one example, if W/H>T, horizontal split patterns or/and quad split pattern may be disallowed.
   k. In one example, if H/W>T, vertical split patterns or/and quad split pattern may be disallowed.
   l. T may be different for different split patterns.
   m. In one example, if a block is at the right boundary or/and left boundary, horizontal split patterns may be disallowed.
   n. In one example, if a block is at the right boundary or/and left boundary, vertical split patterns may be disallowed.
   o. In one example, if a block is at the bottom boundary or/and top boundary, horizontal split patterns may be disallowed.
   p. In one example, if a block is at the bottom boundary or/and top boundary, vertical split patterns may be disallowed.
   q. Signaling of selected split pattern may depend on the number of allowed split patterns for a block.
      i. For example, if there is only one allowed split pattern for a block, no bit is signaled to indicate the split pattern.
   r. The constrains may depend on the coding information of the current and/or neighbouring blocks.
      i. For example, T, T1 and T2 in the above bullets may be different when the current block is inter-coded or IBC-coded.
   s. The constrains may depend on the color components.
      i. For example, T, T1 and T2 in the above bullets may be different for the Y-component and Cb or Cr components.
   t. The constrains may depend on the color formats.
      i. For example, T, T1 and T2 in the above bullets may be different for 4:2:0 format and 4:4:4 format.
   u. The constrains may depend on the color representations.
      i. For example, T, T1 and T2 in the above bullets may be different for YCbCr color representation and RGB color representation.
7. It is proposed that there may be more than one transform regions in an SBT block.
   a. FIG. 6 shows some examples where there are two transform regions in an SBT block.
8. Allowed split patterns in SBT or/and usage of SBT for blocks may depend on the motion information of the block.
   a. In one example, usage of SBT for blocks and/or allowed split patterns in SBT may be decided according to the usage of illumination compensation.
      i. In one example, when one block is coded with illumination compensation, SBT may be disabled.
   b. In one example, allowed split patterns in SBT for blocks may depend on whether the block is coded in triangle mode or not and/or coded with transform skip mode or not.
   c. In one example, binary split patterns in SBT may be disallowed for blocks coded with triangle mode, but other kinds of split patterns may be applied.
   d. In one example, split patterns wherein half of each triangle PU is covered, e.g., split patterns illustrated in FIG. 6, may be allowed for blocks coded with triangle mode
9. Whether SBT or/and SBT in transform skip mode is allowed or not may depend on the motion information of the block.
   a. In one example, if the block is coded in merge mode, SBT may be disallowed.
   b. In one example, if the block is coded in merge mode and the merge index is smaller than or equal to N (for example, N=0), SBT may be disallowed.
   c. In one example, if the block is coded in AMVP mode, SBT may be disallowed.
   d. In one example, if the block is coded in affine mode, SBT may be disallowed.
   e. In one example, if the block is coded in CIIP mode, SBT may be allowed.
   f. In one example, if the block is coded in IBC mode, SBT may be allowed.
   g. In one example, if the block is coded in weighted prediction mode, SBT may be disallowed.
   h. In one example, if the block is coded with sub-block coded modes (such as ATMVP), SBT may be disallowed.
   i. When SBT is allowed, the indication of usage of SBT may be signaled. On the contrary, when SBT is disallowed, signaling of the indication of usage of SBT is skipped.
10. Residual of a block may be split into M*N subblocks, e.g., 4*4 subblocks, and whether there is non-zero coefficient may be derived for each M*N subblock.
    a. In one example, spatial gradients are calculated for each M*N subblock using its prediction samples, and subblocks with SASG>T may have non-zero coefficient.
    b. In one example, for bi-directional predicted blocks, temporal gradients are calculated for each M*N subblock using its prediction samples in both directions, and subblocks with SATG>T may have non-zero coefficient.
    c. In one example, for bi-directional predicted blocks, both spatial and temporal gradients are calculated for each M*N subblock, and subblocks with SASG>T1 or/and SATG>T2 or/and SASG+SATG>T3 may have non-zero coefficient.
d. SASG may be calculated using gradients of horizontal direction or/and vertical direction or/and 45-degree diagonal direction or/and 135-degree diagonal direction.
e. SASG or/and SATG or/and SATSG may be calculated only for some prediction samples.
 i. For example, SASG or/and SATG or/and SATSG may be calculated for the Mth (1<=M<=N) row of every N (N>=1) rows, e.g., M=1 and N=2.
f. Alternatively, a W1*H1 region contains most such subblocks, i.e., subblocks satisfying above conditions, may have non-zero coefficient.
 i. For example, W1=W/2 and H1=H/2.
 ii. For example, W1=W/4 and H1=H.
 iii. For example, W1=W/2 and H1=H.
 iv. For example, W1=W and H1=H/2.
 v. For example, W1=W and H1=H/4.
11. Residual of a block may be split into N subblocks, and K1 (K1>=0) subblocks are coded in transform skip mode, K2 (K2>=0) subblocks employ transform, and other subblocks have zero coefficient only.
a. In one example, index may be signaled for the K1 subblocks or/and the K2 subblocks.
b. In one example, which subblocks employ transform skip mode may be derived implicitly. For example, if the split pattern contains two subblocks, then subblock with larger SASG or SATG or SASG+SATG may be coded in transform skip mode, and the other subblock may employ transform.
12. Transform skip flag (e.g., transform_skip_flag) may be not signaled and derived implicitly.
a. In one example, if SASG>T1 or/and SATG>T2 or/and SASG+SATG>T3, the block may be coded in transform skip mode.
 i. Alternatively, if SASG>T1 or/and SATG>T2 or/and SASG+SATG>T3, the block may employ transform.
b. In one example, whether transform skip flag is derived or not may depend on the mode or motion information of the block.
 i. For example, transform skip flag may be derived in inter mode or/and intra block copy mode only.
 ii. For example, transform skip flag may be derived only when current block is bi-predicted only.
 iii. For example, transform skip flag may be derived only when there are more than K non-zero coefficients.
c. In one example, transform skip may be disabled when there are less than K non-zero coefficients.
13. Secondary transform may be further applied to the blocks coded with SBT mode.
a. In one example, denote the block size by W*H, it may be firstly transformed by primary transform matrix (such as DCT-II), then the top-left W'*H' transformed region may be further transformed by other transform matrix wherein at least one of the conditions (W' unequal to W and H' unequal to H) is true.
14. Proposed method may be enabled according to the rule on block dimension.
a. In one example, proposed method may be enabled when W*H>=T1 && H>=T2. e.g. T1=64 and T2=8.
b. In one example, when a block size contains less than M*H samples, e.g., 32 or 64 luma samples, proposed method is not allowed.
c. In one example, when a block size contains more than M*H samples, e.g., 32 or 64 luma samples, proposed method is not allowed.
d. Alternatively, when minimum size of a block's width or/and height is smaller than or no larger than X, proposed method is not allowed. In one example, X is set to 8.
e. Alternatively, when a block's width>th1 or >=th1 and/or a block's height>th2 or >=th2, proposed method is not allowed. In one example, X is set to 64.
 i. For example, proposed method is disabled for M×M (e.g., 128×128) block.
 ii. For example, proposed method is disabled for N×M/M×N block, e.g., wherein N>=64, M=128.
 iii. For example, proposed method is disabled for N×M/M×N block, e.g., wherein N>=4, M=128.
f. Alternatively, when a block's width<th1 or <=th1 and/or a block's height<th2 or <=th2, proposed method is not allowed. In one example, th1 and/or th2 is set to 8.

Figure 4:
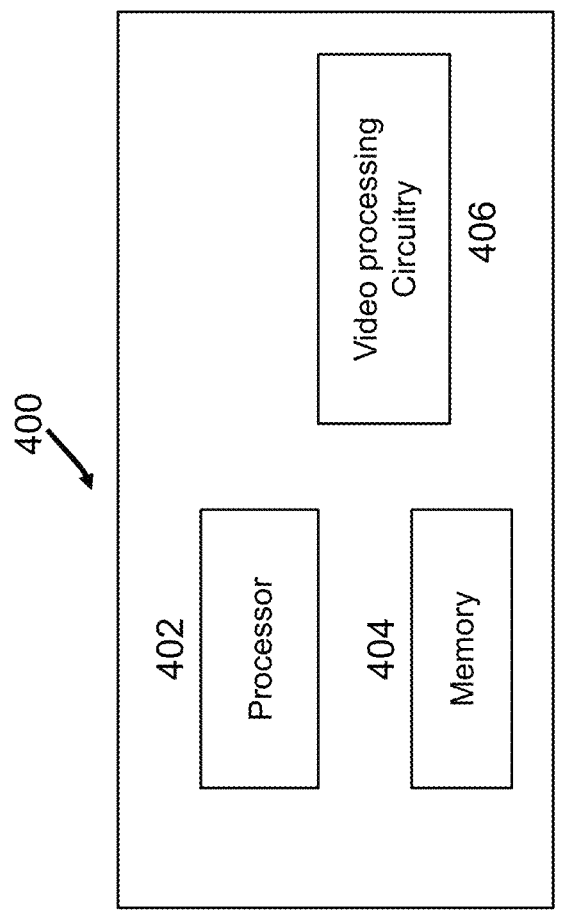
FIG. 4 is a block diagram of an example of a hardware platform for implementing a visual media decoding or a visual media encoding technique described in the present document.

FIG. 4 is a block diagram of a video processing apparatus 400. The apparatus 400 may be used to implement one or more of the methods described herein. The apparatus 400 may be embodied in a smartphone, tablet, computer, Internet of Things (IoT) receiver, and so on. The apparatus 400 may include one or more processors 402, one or more memories 404 and video processing hardware 406. The processor(s) 402 may be configured to implement one or more methods described in the present document. The memory (memories) 404 may be used for storing data and code used for implementing the methods and techniques described herein. The video processing hardware 406 may be used to implement, in hardware circuitry, some techniques described in the present document.

Figure 5:
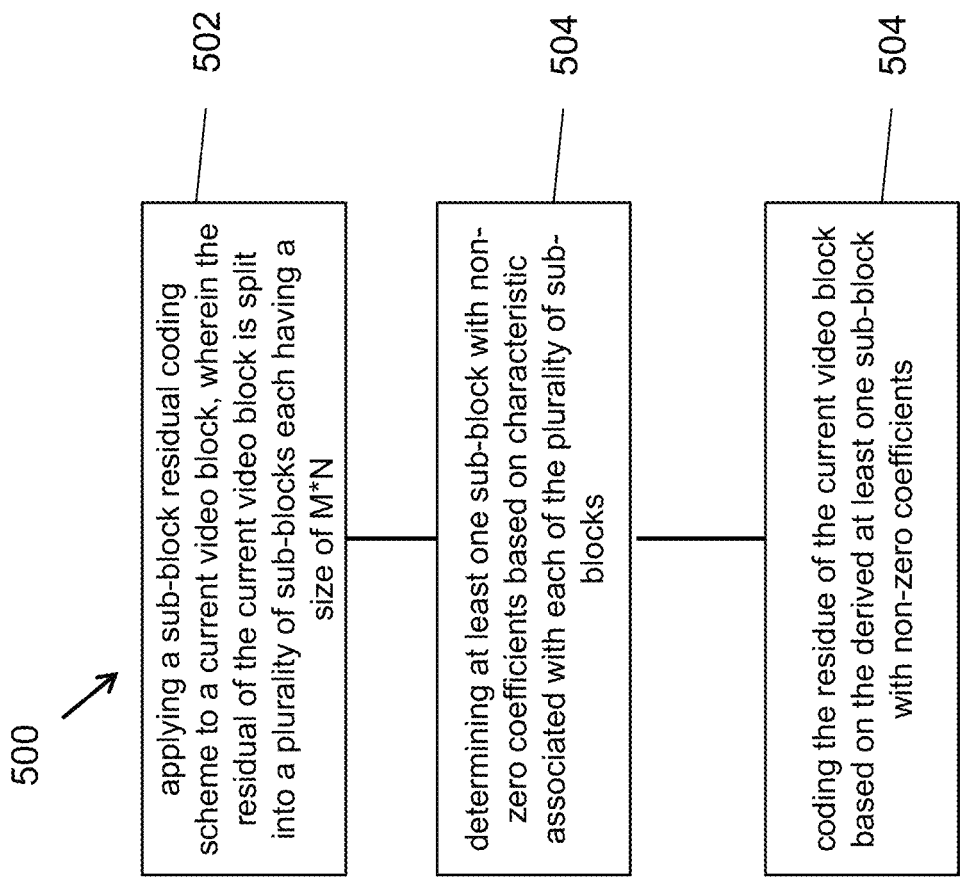
FIG. 5 is a flowchart for an example method of video processing.

FIG. 5 is a flowchart for a method 500 of video processing. The method 500 includes applying (502) a sub-block residual coding scheme to a current video block, wherein the residual of the current video block is split into a plurality of sub-blocks each having a size of M*N, determining (504) at least one sub-block with non-zero coefficients based on characteristic associated with each of the plurality of sub-blocks; coding (506) the residue of the current video block based on the derived at least one sub-block with non-zero coefficients.

Figure 7:
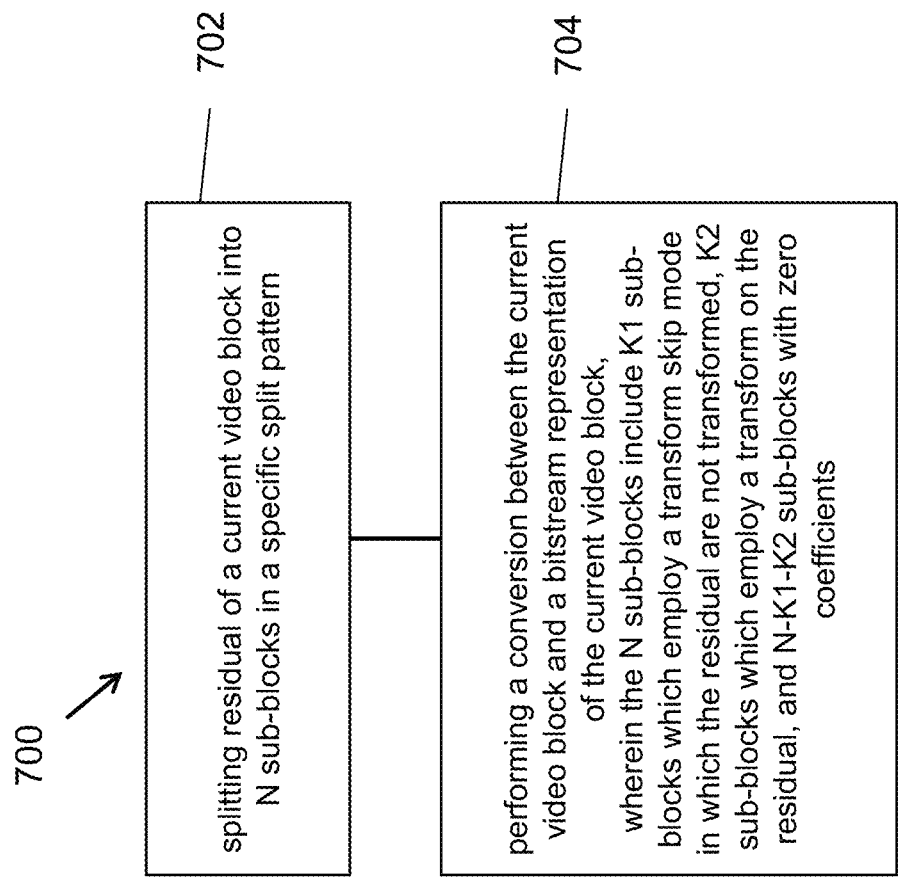
FIG. 7 is a flowchart for an example method of video processing.

FIG. 7 is a flowchart for a method 700 of video processing. The method 700 includes splitting (702) residual of a current video block into N sub-blocks in a specific split pattern; and performing a conversion (704) between the current video block and a bitstream representation of the current video block, wherein the N sub-blocks include K1 sub-blocks which employ a transform skip mode in which the residual are not transformed, K2 sub-blocks which employ a transform on the residual, and N−K1−K2 sub-blocks with zero coefficients, wherein N, K1 and K2 are integers, and K1>=0 and K2>=0.

Figure 8:
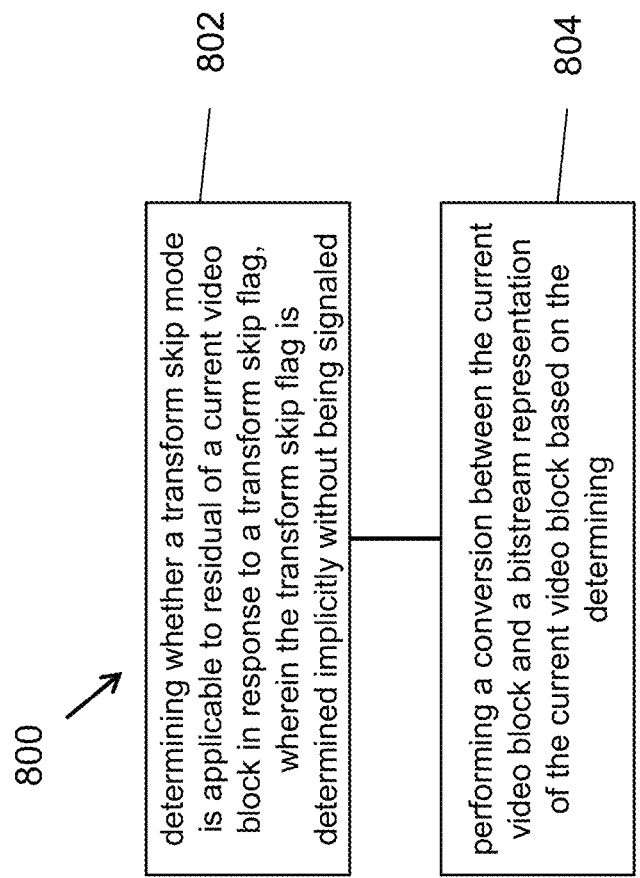
FIG. 8 is a flowchart for an example method of video processing.

FIG. 8 is a flowchart for a method 800 of video processing. The method 800 includes: determining (802) whether a transform skip mode is applicable to residual of a current video block in response to a transform skip flag, wherein the transform skip flag is determined implicitly without being signaled; and performing a conversion (804) between the current video block and a bitstream representation of the current video block based on the determining.

Figure 9:
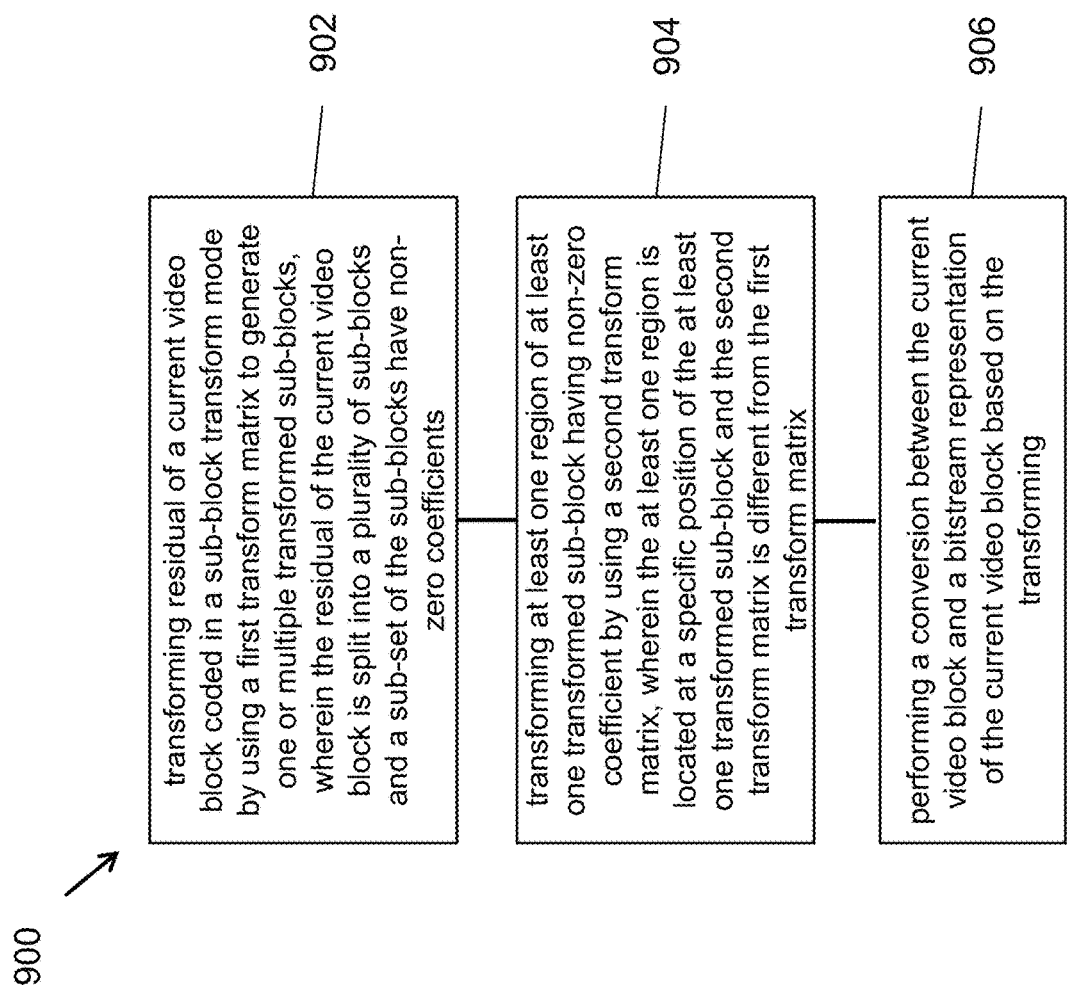
FIG. 9 is a flowchart for an example method of video processing.

FIG. 9 is a flowchart for a method 900 of video processing. The method 900 includes: transforming (902) residual of a current video block coded in a sub-block transform mode by using a first transform matrix to generate one or multiple transformed sub-blocks, wherein the residual of the current video block is split into a plurality of sub-blocks and a sub-set of the sub-blocks have non-zero coefficients; transforming (904) at least one region of at least one transformed sub-block having non-zero coefficient by using a second transform matrix, wherein the at least one region is located at a specific position of the at least one transformed sub-block and the second transform matrix is different from the first transform matrix; and performing a conversion (906) between the current video block and a bitstream representation of the current video block based on the transforming.

The following clauses, along with the listing in Section 4, provide additional embodiments and examples of the disclosed technology.

In one aspect, there is disclosed a method for video processing, comprising:

applying a sub-block residual coding scheme to a current video block, wherein the residual of the current video block is split into a plurality of sub-blocks each having a size of M*N, determining at least one sub-block with non-zero coefficients based on characteristic associated with each of the plurality of sub-blocks; coding the residue of the current video block based on the derived at least one sub-block with non-zero coefficients.

In one example, the characteristic associated with each of the plurality of sub-blocks comprises spatial gradients of each of the plurality of sub-blocks; and the spatial gradients are calculated for each of the plurality of sub-blocks based on prediction samples associated with each sub-block, and one or more sub-blocks with a sum of absolute spatial gradients (SASG) larger than a first threshold T1 are determined to have non-zero coefficients.

In one example, if the current video block is a bi-directional predicted block, the characteristic associated with each of the plurality of sub-blocks comprises temporal gradients of each of the plurality of sub-blocks.

In one example, temporal gradients are calculated for each of the plurality of sub-blocks based on prediction samples associated with each sub-block in both directions, and one or more sub-blocks with a sum of absolute temporal gradients (SATG) larger than a second threshold T2 are determined to have non-zero coefficients.

In one example, the characteristic associated with each of the plurality of sub-blocks further comprises spatial gradients of each of the plurality of sub-blocks; and both spatial and temporal gradients are calculated for each of the plurality of sub-blocks based on prediction samples associated with each sub-block in both directions.

In one example, one or more sub-blocks with a sum of absolute spatial gradients (SASG) larger than a third threshold T3 are determined to have non-zero coefficients.

In one example, one or more sub-blocks with a sum of absolute temporal and spatial gradients (SATSG) larger than a fourth threshold T4 are determined to have non-zero coefficients.

In one example, the sum of absolute spatial gradients (SASG) is calculated for each of the plurality of sub-blocks by using the spatial gradients in a specific direction.

In one example, the specific direction comprises one of a horizontal direction, a vertical direction, a 45-degree diagonal direction and a 135-degree diagonal direction.

In one example, the prediction samples associated with each sub-block are located at specific positions.

In one example, the specific positions comprise $P^{th}$ row of every Q rows.

In one example, P=1 and Q=2.

In one example, the one or more sub-blocks with non-zero coefficients are located within a rectangular region in the current video block.

In one example, the rectangular region is determined to have non-zero coefficients and has one of sizes as follows:
W/2*H/2;
W/4*H;
W/2*H;
W*H/2;
W*H/4,
wherein W and H represent a width and height of the current video block respectively.

In another aspect, there is disclosed a method for video processing, comprising:

splitting residual of a current video block into N sub-blocks in a specific split pattern; and performing a conversion between the current video block and a bitstream representation of the current video block, wherein the N sub-blocks include K1 sub-blocks which employ a transform skip mode in which the residual are not transformed, K2 sub-blocks which employ a transform on the residual, and N−K1−K2 sub-blocks with zero coefficients, wherein N, K1 and K2 are integers, and K1>=0 and K2>=0.

In one example, an index is signaled to indicate which sub-blocks employ the transform skip mode or to indicate which sub-blocks employ the transform on the residual.

In one example, it is determined which the sub-blocks employ the transform skip mode implicitly from the specific split pattern.

In one example, if N=2, one of two sub-blocks which has a larger sum of absolute spatial gradients (SASG) is determined to employ the transform skip mode.

In one example, if N=2, one of two sub-blocks which has a larger sum of absolute temporal gradients (SATG) is determined to employ the transform skip mode.

In one example, if N=2, one of two sub-blocks which has a larger sum of absolute temporal and spatial gradients (SATSG) is determined to employ the transform skip mode.

In yet another aspect, there is disclosed a method for video processing, comprising:

determining whether a transform skip mode is applicable to residual of a current video block in response to a transform skip flag, wherein the transform skip flag is determined implicitly without being signaled; and performing a conversion between the current video block and a bitstream representation of the current video block based on the determining.

In one example, spatial gradients are calculated for the current video block based on prediction samples associated with the current video block, and if the current video block has a sum of absolute spatial gradients (SASG) larger than a first threshold T1, the transform skip flag is determined implicitly to indicate that the transform skip mode is applicable to the residual of the current video block.

In one example, if the current video block is a bi-directional predicted block, temporal gradients are calculated for the current video block based on prediction samples associated with the current video block in both directions.

In one example, if the current video block has a sum of absolute temporal gradients (SATG) larger than a second threshold T2, the transform skip flag is determined to indicate that the transform skip mode is applicable to the residual of the current video block.

In one example, spatial gradients are further calculated for the current video block based on prediction samples associated with the current video block, and if the current video block has a sum of absolute temporal and spatial gradients (SATSG) larger than a third threshold T3, the transform skip flag is determined to indicate that the transform skip mode is applicable to the residual of the current video block.

In one example, spatial gradients are calculated for the current video block based on prediction samples associated with the current video block, and if the current video block has a sum of absolute spatial gradients (SASG) larger than a fourth threshold T4, the transform skip flag is determined to indicate that a transform is applied to the residual of the current video block.

In one example, if the current video block is a bi-directional predicted block, temporal gradients are calculated for the current video block based on prediction samples associated with the current video block in both directions.

In one example, if the current video block has a sum of absolute temporal gradients (SATG) larger than a fifth threshold T5, the transform skip flag is determined to indicate that a transform is applied to the residual of the current video block.

In one example, spatial gradients are further calculated for the current video block based on prediction samples associated with the current video block, and if the current video block has a sum of absolute temporal and spatial gradients (SATSG) larger than a sixth threshold T6, the transform skip flag is determined to indicate that a transform is applied to the residual of the current video block.

In one example, whether the transform skip flag is determined implicitly depend on a coding mode or motion information of the current video block.

In one example, the transform skip flag is determined implicitly if the current video block is coded with at least one of an inter mode, an intra block copy (IBC) mode and a bi-prediction mode.

In one example, the transform skip flag is determined implicitly if the residual of the current video block have more than K non-coefficients.

In one example, the transform skip flag is determined implicitly to indicate that the transform skip mode is not applicable to the residual of the current video block if the residual of the current video block have less than K non-coefficients.

In yet another aspect, there is disclosed a method for video processing, comprising:

transforming residual of a current video block coded in a sub-block transform mode by using a first transform matrix to generate one or multiple transformed sub-blocks, wherein the residual of the current video block is split into a plurality of sub-blocks and a sub-set of the sub-blocks have non-zero coefficients;

transforming at least one region of at least one transformed sub-block having non-zero coefficient by using a second transform matrix, wherein the at least one region is located at a specific position of the at least one transformed sub-block and the second transform matrix is different from the first transform matrix; and performing a conversion between the current video block and a bitstream representation of the current video block based on the transforming.

In one example, the specific position comprises a top-left position of the at least one transformed sub-block.

In one example, the at least one region has at least one of width and height less than that of the at least one transformed sub-block.

In one example, whether the method is enabled depends on a block dimension of the current video block.

In one example, the method is enabled if the block dimension of the current video block satisfies: W*H>=T1, and H>=T2.

In one example, T1=64 and T2=8.

In one example, the method is disabled if the block dimension of the current video block satisfies at least one of the following:

an amount of samples contained in the current video block is less than a first threshold;

a minimum size of a height and width of the current video block is not more than a second threshold;

the height of the current video block is not more than a third threshold; and the width of the current video block is not more than a fourth threshold.

In one example, the first threshold is equal to one of 32 and 64.

In one example, the second threshold is equal to 8.

In one example, at least one of the third and fourth thresholds is equal to 8.

In one example, the method is disabled if the block dimension of the current video block satisfies at least one of the following:

an amount of samples contained in the current video block is more than a fifth threshold;

a height of the current video block is not less than a sixth threshold; and a width of the current video block is not less than a seventh threshold.

In one example, the fifth threshold is equal to one of 32 and 64.

In one example, at least one of the sixth and seventh thresholds is equal to 64.

In one example, the method is disabled if the current video block has a size of M×M, M×N or N×M, wherein M=128, and N=64 or 4.

In one example, the conversion includes encoding the current video block into the bitstream representation of a video and decoding the current video block from the bitstream representation of the video.

In yet another aspect, there is disclosed an apparatus in a video system comprising a processor and a non-transitory memory with instructions thereon, wherein the instructions upon execution by the processor, cause the processor to implement the method as described above.

In yet another aspect, there is disclosed a non-transitory computer readable media, having program code stored thereupon, the program code, when executed, causing a processor to implement the method as described above.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them.

Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
    determining, based on a block dimension of a current video block of a video, whether a sub-block residual coding scheme is applied to residual of the current video block, wherein the sub-block residual coding scheme splits the residual of the current video block into multiple sub-blocks and a subset of the multiple sub-blocks has non-zero coefficients;
    determining, based on the block dimension of the current video block, a specific split pattern to be applied to the residual of the current video block, in response to the sub-block residual coding scheme being applied to the residual of the current video block;
    deriving the subset of the multiple sub-blocks which has non-zero coefficients; and
    performing a conversion between the current video block and a bitstream of the video based on the determined subset of the multiple sub-blocks having non-zero coefficients;
    wherein the determining of whether the sub-block residual coding scheme is applied to the residual of the current video block comprises that the sub-block residual coding scheme is not allowed in response to a size of the current video block satisfying at least one of: a width of the current video block being larger than threshold 1 (th1) or a height of the current video block being larger than threshold 2 (th2), wherein th1 and th2 are integers.

2. The method of claim 1, wherein th1=th2=64.

3. The method of claim 1, wherein determining whether the sub-block residual coding scheme is applied to residual of the current video block based on the block dimension of the current video block, comprises that the sub-block residual coding scheme is not allowed in response to the width of the current video block being smaller than or equal to threshold 3 (th3) and the height of the current video block being smaller than or equal to threshold 4 (th4), wherein th3 and th4 are integers.

4. The method of claim 1, wherein determining whether the sub-block residual coding scheme is applied to residual of the current video block based on the block dimension of the current video block, comprises that the sub-block residual coding scheme is not allowed in response to the width of the current video block being smaller than threshold 5 (th5) and the height of the current video block being smaller than threshold 6 (th6), wherein th5 and th6 are integers.

5. The method of claim 4, wherein th5=th6=8.

6. The method of claim 1, wherein determining the specific split pattern based on the block dimension of the current video block, comprises that the current video block is not split into a pattern in which one of sub-blocks has a size of W/4*H, in response to the width of the current video block being smaller than threshold 7 (th7), wherein W and H represent the width of the current video block and the height of the current video block respectively and th7 is an integer.

7. The method of claim 6, wherein th7=16.

8. The method of claim 1, wherein determining the specific split pattern based on the block dimension of the current video block, comprises that the current video block is not split into a pattern in which one of sub-blocks has a size of W/2*H, in response to the width of the current video block being smaller than threshold 8 (th8), wherein W and H represent the width of the current video block and the height of the current video block respectively and th8 is an integer.

9. The method of claim 1, wherein determining the specific split pattern based on the block dimension of the current video block, comprises that the current video block is not split into a pattern in which one of sub-blocks has a size of W*H/4, in response to the height of the current video block being smaller than threshold 9 (th9), wherein W and H represent the width of the current video block and the height of the current video block respectively and th9 is an integer.

10. The method of claim 9, wherein th9=16.

11. The method of claim 1, wherein determining the specific split pattern based on the block dimension of the current video block, comprises that the current video block is not split into a pattern in which one of sub-blocks has a size of W*H/2, in response to the height of the current video block being smaller than threshold 10 (th10), wherein W and H represent the width of the current video block and the height of the current video block respectively and th10 is an integer.

12. The method of claim 1, wherein determining the specific split pattern based on the block dimension of the current video block, comprises that the current video block is not split horizontally, in response to a ratio of a width to a height W/H being larger than threshold 11 (th11), wherein W and H represent the width and the height of the current video block respectively and th11 is an integer.

13. The method of claim 1, wherein determining the specific split pattern based on the block dimension of the current video block, comprises that the current video block is not split horizontally to generate a pattern in which one of sub-blocks has a size of W H/4, in response to W/H being larger than threshold 12 (th12), wherein W and H represent the width and the height of the current video block respectively and th12 is an integer.

14. The method of claim 1, wherein determining the specific split pattern based on the block dimension of the current video block, comprises that the current video block is not split vertically, in response to a ratio of a height to a width H/W being larger than threshold 13 (th13), wherein W and H represent the width and the height of the current video block respectively and th13 is an integer.

15. The method of claim 1, wherein determining the specific split pattern based on the block dimension of the current video block, comprises that the current video block is not split vertically to generate a pattern in which one of sub-blocks has a size of W/4*H, in response to H/W being larger than threshold 14 (th14), wherein W and H represent the width and the height of the current video block respectively and th14 is an integer.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:
   determine, based on a block dimension of a current video block of a video, whether a sub-block residual coding scheme is applied to residual of the current video block, wherein the sub-block residual coding scheme splits the residual of the current video block into multiple sub-blocks and a subset of the multiple sub-blocks has non-zero coefficients;
   determine, based on the block dimension of the current video block, a specific split pattern to be applied to the residual of the current video block, in response to the sub-block residual coding scheme being applied to the residual of the current video block;
   derive the subset of the multiple sub-blocks which has non-zero coefficients; and
   perform a conversion between the current video block and a bitstream of the video based on the determined subset of the multiple sub-blocks having non-zero coefficients;
   wherein the determining of whether the sub-block residual coding scheme is applied to the residual of the current video comprises that the sub-block residual coding scheme is not allowed in response to a size of the current video block satisfying at least one of: a width of the current video block being larger than threshold 1 (th1) or a height of the current video block being larger than threshold 2 (th2), wherein th1 and th2 are integers.

19. The apparatus of claim 18, wherein determining whether the sub-block residual coding scheme is applied to residual of the current video block based on the block dimension of the current video block, comprises at least one of the following that:
   the sub-block residual coding scheme is not allowed in response to the width of the current video block being smaller than or equal to threshold 3 (th3) and the height of the current video block being smaller than or equal to threshold 4 (th4), wherein th3 and th4 are integers; or
   the sub-block residual coding scheme is not allowed in response to the width of the current video block being smaller than threshold 5 (th5) and the height of the current video block being smaller than threshold 6 (th6), wherein th5 and th6 are integers; and determining the specific split pattern based on the block dimension of the current video block, comprises at least one of the following that:

the current video block is not split into a pattern in which one of sub-blocks has a size of W/4*H, in response to the width of the current video block being smaller than threshold 7 (th7), wherein W and H represent the width of the current video block and the height of the current video block respectively and th7 is an integer; or the current video block is not split into a pattern in which one of sub-blocks has a size of W/2*H, in response to the width of the current video block being smaller than threshold 8 (th8), wherein W and H represent the width of the current video block and the height of the current video block respectively and th8 is an integer; or the current video block is not split into a pattern in which one of sub-blocks has a size of W*H/4, in response to the height of the current video block being smaller than threshold 9 (th9), wherein W and H represent the width of the current video block and the height of the current video block respectively and th9 is an integer; or the current video block is not split into a pattern in which one of sub-blocks has a size of W*H/2, in response to the height of the current video block being smaller than threshold 10 (th10), wherein W and H represent the width of the current video block and the height of the current video block respectively and th10 is an integer; or the current video block is not split horizontally, in response to a ratio of a width to a height W/H being larger than threshold 11 (th11), wherein W and H represent the width and the height of the current video block respectively and th11 is an integer; or the current video block is not split horizontally to generate a pattern in which one of sub-blocks has a size of W*H/4, in response to W/H being larger than threshold 12 (th12), wherein W and H represent the width and the height of the current video block respectively and th12 is an integer; or the current video block is not split vertically, in response to a ratio of a height to a width H/W being larger than threshold 13 (th13), wherein W and H represent the width and the height of the current video block respectively and th13 is an integer; or the current video block is not split vertically to generate a pattern in which one of sub-blocks has a size of W/4*H, in response to H/W being larger than threshold 14 (th14), wherein W and H represent the width and the height of the current video block respectively and th14 is an integer.

20. A non-transitory computer-readable storage medium storing instructions that cause a processor to:

determine, based on a block dimension of a current video block of a video, whether a sub-block residual coding scheme is applied to residual of the current video block, wherein the sub-block residual coding scheme splits the residual of the current video block into multiple sub-blocks and a subset of the multiple sub-blocks has non-zero coefficients;

determine, based on the block dimension of the current video block, a specific split pattern to be applied to the residual of the current video block, in response to the sub-block residual coding scheme being applied to the residual of the current video block;

derive the subset of the multiple sub-blocks which has non-zero coefficients; and perform a conversion between the current video block and a bitstream of the video based on the determined subset of the multiple sub-blocks having non-zero coefficients;

wherein the determining of whether the sub-block residual coding scheme is applied to the residual of the current video block comprises that the sub-block residual coding scheme is not allowed in response to a size of the current video block satisfying at least one of: a width of the current video block being larger than threshold 1 (th1) or a height of the current video block being larger than threshold 2 (th2), wherein th1 and th2 are integers.

21. The non-transitory computer-readable storage medium of claim 20, wherein determining whether the sub-block residual coding scheme is applied to residual of the current video block based on the block dimension of the current video block, comprises at least one of the following that:

the sub-block residual coding scheme is not allowed in response to the width of the current video block being smaller than or equal to threshold 3 (th3) and the height of the current video block being smaller than or equal to threshold 4 (th4), wherein th3 and th4 are integers; or the sub-block residual coding scheme is not allowed in response to the width of the current video block being smaller than threshold 5 (th5) and the height of the current video block being smaller than threshold 6 (th6), wherein th5 and th6 are integers; and determining the specific split pattern based on the block dimension of the current video block, comprises at least one of the following that:

the current video block is not split into a pattern in which one of sub-blocks has a size of W/4*H, in response to the width of the current video block being smaller than threshold 7 (th7), wherein W and H represent the width of the current video block and the height of the current video block respectively and th7 is an integer; or the current video block is not split into a pattern in which one of sub-blocks has a size of W/2*H, in response to the width of the current video block being smaller than threshold 8 (th8), wherein W and H represent the width of the current video block and the height of the current video block respectively and th8 is an integer; or the current video block is not split into a pattern in which one of sub-blocks has a size of W*H/4, in response to the height of the current video block being smaller than threshold 9 (th9), wherein W and H represent the width of the current video block and the height of the current video block respectively and th9 is an integer; or the current video block is not split into a pattern in which one of sub-blocks has a size of W*H/2, in response to the height of the current video block being smaller than threshold 10 (th10), wherein W and H represent the width of the current video block and the height of the current video block respectively and th10 is an integer; or the current video block is not split horizontally, in response to a ratio of a width to a height W/H being larger than threshold 11 (th11), wherein W and H represent the width and the height of the current video block respectively and th11 is an integer; or the current video block is not split horizontally to generate a pattern in which one of sub-blocks has a size of W*H/4, in response to W/H being larger than threshold 12 (th12), wherein W and H represent the width and the height of the current video block respectively and th12 is an integer; or the current video block is not split vertically, in response to a ratio of a height to a width H/W being larger than threshold 13 (th13), wherein W and H represent the width and the height of the current video block respectively and th13 is an integer; or the current video block is not split vertically to generate a pattern in which one of sub-blocks has a size of W/4*H, in response to H/W being larger than threshold 14 (th14), wherein W and H represent the width and the height of the current video block respectively and th14 is an integer.

22. A method for storing a bitstream of a video, comprising:

determining, based on a block dimension of a current video block of a video, whether a sub-block residual coding scheme is applied to residual of the current video block, wherein the sub-block residual coding scheme splits the residual of the current video block into multiple sub-blocks and a subset of the multiple sub-blocks has non-zero coefficients;

determining, based on the block dimension of the current video block, a specific split pattern to be applied to the residual of the current video block, in response to the sub-block residual coding scheme being applied to the residual of the current video block;

deriving the subset of the multiple sub-blocks which has non-zero coefficients;

generating the bitstream based on the determined subset of the multiple sub-blocks having non-zero coefficients; and storing the bitstream in a non-transitory computer-readable recording medium;

wherein the determining of whether the sub-block residual coding scheme is applied to the residual of the current video block comprises that the sub-block residual coding scheme is not allowed in response to a size of the current video block satisfying at least one of: a width of the current video block being larger than threshold 1 (th1) or a height of the current video block being larger than threshold 2 (th2), wherein th1 and th2 are integers.

* * * * *